US008524316B1

United States Patent
Tomita et al.

(10) Patent No.: US 8,524,316 B1
(45) Date of Patent: Sep. 3, 2013

(54) METHOD OF MAKING GOLF BALL WITH SINTERED LAYER

(75) Inventors: Seisuke Tomita, Tokyo (JP); Arthur Molinari, Beaverton, OR (US); Takahisa Ono, Fujisawa (JP)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 13/436,518

(22) Filed: Mar. 30, 2012

(51) Int. Cl.
*C23C 24/04* (2006.01)
*B05D 1/06* (2006.01)
*B05D 1/38* (2006.01)

(52) U.S. Cl.
USPC ..... 427/189; 427/375; 427/372.2; 427/376.1; 427/475

(58) Field of Classification Search
USPC ................. 427/189, 457–485, 427.1, 427.4, 427/427.7, 375, 372.2, 376.1
See application file for complete search history.

(56) References Cited

U.S. PATENT DOCUMENTS

| 5,723,187 A | 3/1998 | Popoola et al. |
| 5,938,944 A | 8/1999 | Baughman et al. |
| 2002/0022537 A1* | 2/2002 | Nesbitt et al. ................. 473/378 |
| 2010/0248862 A1* | 9/2010 | Sullivan et al. ............... 473/373 |
| 2010/0323817 A1* | 12/2010 | Molinari ....................... 473/371 |

* cited by examiner

*Primary Examiner* — Frederick Parker
*Assistant Examiner* — Ann Disarro
(74) *Attorney, Agent, or Firm* — Plumsea Law Group, LLC

(57) ABSTRACT

A method of manufacturing a golf ball with a deposited layer is disclosed. The deposited layer is not produced by a molding process, such as injection molding or compression molding. Instead, the deposition process is produced by another process, such as sintering. The deposited layer may include partially fused particulate material. The deposited layer may be added to a golf ball design as one or more supplemental layers. The deposited layer may also be provided in a golf ball design as a substitute for one or more layers. A golf ball may further include a combination of one or more supplemental deposited layers and one or more substituted deposited layers.

19 Claims, 10 Drawing Sheets

METHOD OF MAKING GOLF BALL WITH SINTERED LAYER

BACKGROUND

The present invention relates generally to a golf ball, and a method of manufacturing the golf ball. In particular, the golf ball includes at least one deposited layer that affects a property of the golf ball.

The game of golf is an increasingly popular sport at both the amateur and professional levels. A wide range of technologies related to the manufacture and design of golf balls are known in the art. Such technologies have resulted in golf balls with a variety of play characteristics. For example, different golf balls are manufactured and marketed to players having different golfing abilities, such as different swing speeds.

Accordingly, a golfer may use different golf balls having different play characteristics depending on the golfer's preferences. For example, different dimple patterns may affect the aerodynamic properties of the golf ball during flight, a difference in the cover hardness may affect the rate of backspin, or a difference in the moment of inertia may also affect the rate of backspin. With regard to the moment of inertia in particular, a golfer may choose to use a golf ball having a higher moment of inertia or a lower moment of inertia. A higher moment of inertia will generally result in a lower rate of spin by the golf ball during flight after being struck by a golf club face, while a lower moment of inertia will generally result in a higher rate of spin by the golf ball. Higher rates of spin are generally associated with better controllability, while lower rates of spin are generally associated with increased distance off the tee.

Therefore, there is a need in the art for a system and method that addresses the issues discussed above.

SUMMARY

A golf ball with a deposited layer and a method of manufacturing a golf ball with a deposited layer is disclosed. The deposited layer is not produced by a molding process, such as injection molding or compression molding. Instead, the deposition process is produced by another process, such as spraying or sintering. The deposited layer may be added to a golf ball design as one or more supplemental layers. The deposited layer may also be provided in a golf ball design as a substitute for one or more layers. A golf ball may further include a combination of one or more supplemental deposited layers and one or more substituted deposited layers.

The deposited layer may include partially fused particulates. The deposited layer may include pores located between the partially fused particulates. The deposited layer may include a metal, which may be selected from the group consisting of: aluminum, steel, tungsten, titanium, magnesium, iron, and alloys and mixtures thereof. The deposited layer may include fused particles provided on a cover, with the deposited layer having a thickness of approximately 10-30 micrometers. The fused particles may form a sintered layer on a cover, with the sintered layer including pits located in at least one of dimples and lands formed by the cover. When a first deposited layer is formed on a first layer of a golf ball, a second layer may be formed on the deposited layer and a second deposited layer may be formed on the second layer. The first layer of a golf ball may be at least one of a core layer and a mantle, and the second layer is at least one of a core layer, a mantle, and a cover layer. In another instance, the first layer is a core layer and the second layer is a mantle. In another instance, the first layer is a core layer and the second layer is a cover layer. Further, a first deposited layer may include a thermoplastic polymer deposited by a sintering process and the second deposited layer may include a thermoset polymer deposited by a thermal spraying process.

A supplemental deposited layer may have a thickness of, for example, approximately 10 micrometers to 50 micrometers. A deposited layer substituted for an existing layer may have a thickness of, for example, approximately 100 micrometers to 2 mm or more. A deposited layer may have a porosity of, for example, approximately 1-20% of its volume. In another example, the deposited layer may have a porosity of approximately 10-20% of its volume. A deposited layer may be provided to alter the properties and performance of a golf ball. For example, the deposited layer may affect the moment of inertia, hardness, wear resistance, aerodynamics, energy transferal between layers, and other properties.

In one aspect, a method of making a golf ball may include providing a golf ball component. A first layer may be deposited onto the golf ball component by a sintering process. The sintering process may include coating the golf ball component with particulate material, and applying at least one of heat and pressure to the golf ball component coated with particulate material to sinter the particulate material.

In another aspect, a method of making a golf ball may include forming a first layer of the golf ball. The method may further include depositing particles onto the first layer. The deposited particles may be fused together by sintering.

In another aspect, a method of making a golf ball may include providing a golf ball component. The golf ball component may be coated with particulate material. The method may further include sintering the golf ball component and particulate material with at least one of heat and pressure to form a sintered layer. The sintered layer may include partially fused particulate material.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments described herein regard a golf ball with a deposited layer and a method of manufacturing a golf ball including a deposited layer. The deposited layer is not produced by a molding process, such as injection molding or compression molding. Instead, the deposition process is produced by another process, such as spraying or sintering. The deposited layer may be added to a golf ball design as one or more supplemental layers. The deposited layer may also be provided in a golf ball design as a substitute for one or more layers. A golf ball may further include a combination of one or more supplemental deposited layers and one or more substituted deposited layers.

First, a discussion will be provided regarding golf ball constructions before discussing how deposited layers are provided within the various golf ball constructions. Solid golf balls traditionally have multiple layers. While it is possible to use a golf ball that is made of one solid material, such a ball typically exhibits low-performance because golf balls having multiple layers are typically designed to allow a golfer to strike the ball such that it would fly longer or with greater control than a ball made of one solid material. Each layer of a golf ball is selected to provide one or more key characteristics for the golfer. The present embodiments also include multiple layers.

To provide a golf ball with a range of properties not normally exhibited by a solid golf ball, golf balls having a multi-piece construction have been developed. The different pieces of a multi-piece golf ball may be made of different materials that perform in different ways. For example, one piece of a multi-piece golf ball may provide a desired compression, while another piece may provide a durable cover. Exemplary embodiments of multi-piece golf balls will now be reviewed.

Figure 1:
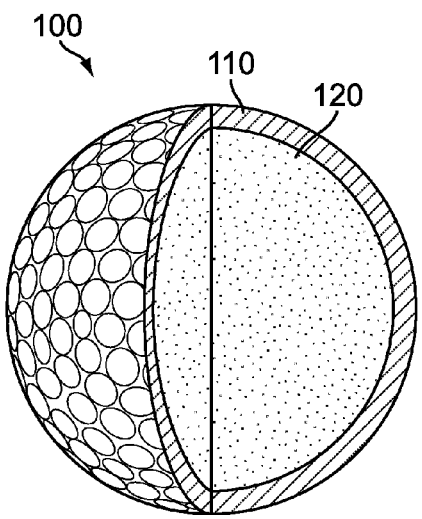
FIG. 1 shows a first representative golf ball in accordance with this disclosure, the golf ball being of a two-piece construction.

FIGS. 1-4 show various embodiments of multi-piece golf balls in accordance with this disclosure. FIG. 1 shows a first golf ball 100 having aspects in accordance with this disclosure. Golf ball 100 is a two-piece golf ball. Specifically, golf ball 100 includes cover layer 110 substantially surrounding core 120. Cover layer 110 may be formed of any golf ball cover material known in the art, which in some embodiments maybe a relatively soft but durable material. For example, cover layer 110 may be formed of a material that compresses/flexes when struck by a golf dub, in order to provide spin of the ball and fed to the player. Although relatively soft, the material may also be durable, in order to withstand scuffing from the dub and/or the golf course.

FIG. 1 illustrates the outer surface of cover layer 110 as having a generic dimple pattern. While the dimple pattern on golf ball 100 may affect the flight path of golf ball 100, any suitable dimple pattern may be used with the disclosed embodiments. In some embodiments, golf ball 100 may be provided with a dimple pattern including a total number of dimples between approximately 300 and 400.

Figure 2:
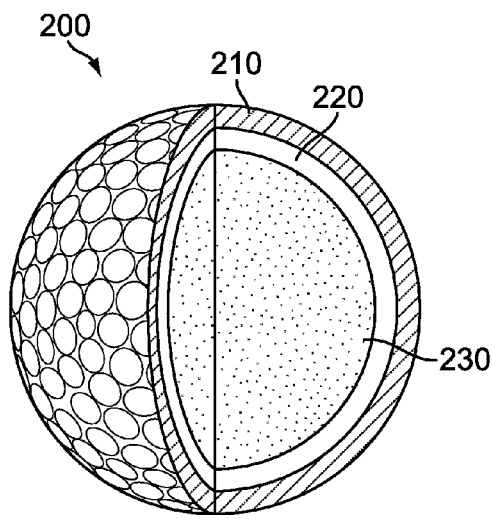
FIG. 2 shows a second representative golf ball, the golf ball having an mantle layer and an outer cover layer.

FIG. 2 shows a second golf ball 200 having aspects in accordance with this disclosure. Golf ball 200 includes a core 230, a mantle layer 220 substantially surrounding core 230, and an outer cover layer 210 substantially surrounding mantle 220.

Figure 3:
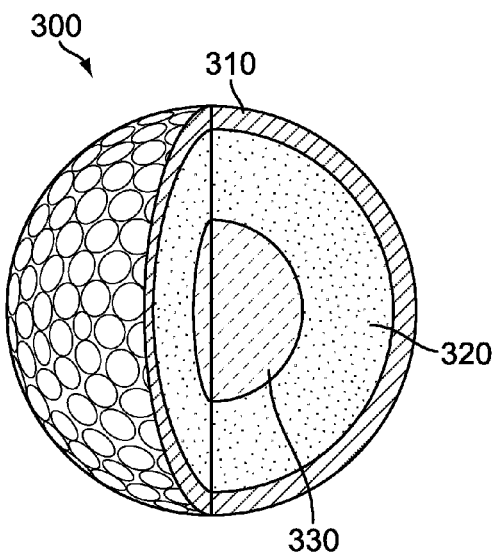
FIG. 3 shows a third representative golf ball, the golf ball having an inner core and an outer core.

FIG. 3 shows a third golf ball 300 having aspects in accordance with this disclosure, where third golf ball 300 has a three-piece construction. Three-piece golf ball 300 includes a first inner core 330, a first outer core 320 substantially surrounding first inner core 330, and a first cover layer 310 substantially surrounding first outer core layer 320.

Figure 4:
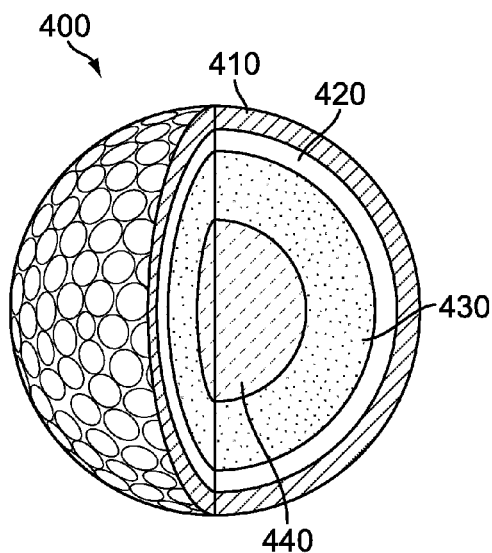
FIG. 4 shows a fourth representative golf ball, the golf ball having an inner core, an outer core, an mantle layer, and an outer cover layer.

FIG. 4 shows a fourth golf ball 400 having aspects in accordance with this disclosure, where fourth golf ball 400 has a four-piece construction. Golf ball 400 includes a second inner core layer 440, a second outer core layer 430 substantially surrounding second inner core layer 440, an mantle layer 420 substantially surrounding outer core layer 430, and an outer cover layer 410 substantially surrounding mantle layer 420.

Generally, the term "core" as used herein refers to at least one of the innermost structural components of the golf ball. The term core may therefore refer, with reference to FIG. 3 but applicable to any embodiment discussed herein, to (1) first inner core 330 only, (2) both first inner core 330 and first outer core 320 collectively, or (3) first outer core 320 only. The term core may also encompass more than two layers if, for example, an additional structural layer is present between first inner core 330 and first outer core 320 or encompassing first outer core 320.

A core may be formed from thermosetting or thermoplastic materials, such as polyurethane, polyurea, partially or fully neutralized ionomers, thermosetting polydiene rubber, such as polybutadiene, polyisoprene, ethylene propylene diene monomer rubber, ethylene propylene rubber, natural rubber, balata, butyl rubber, halobutyl rubber, styrene butadiene rubber or any styrenic block copolymer, such as styrene ethylene butadiene styrene rubber, etc., metallocene or other single site catalyzed polyolefin, polyurethane copolymers, e.g. with silicone.

In addition to the materials discussed above, compositions for portions of a golf ball, such as the core, cover, or any intermediate layer (a layer between the innermost core and the outermost cover layer) may incorporate one or more polymers. Examples of suitable additional polymers include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species. Suitable polyamides for use as an additional material in compositions within the scope of the present invention also include resins obtained by: (1) polycondensation of (a) a dicarboxylic acid, such as oxalic acid, adipic acid, sebacic add, terephthalic add, isophthalic add or 1,4-cyclohexanedicarboxylic add, with (b) a diamine, such as ethylenediamine, tetramethylenediamine, pentamethylenediamine, hexamethylenediamine or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic add, such as 6-aminocaproic add, 9-aminononanoic add, 11-aminoundecanoic add or 12-aminododecanoic add; or (4) copolymerization of a cyclic lactam with a dicarboxylic add and a diamine. Specific examples of suitable polyamides include Nylon 6, Nylon 66, Nylon 610, Nylon 11, Nylon 12, copolymerized Nylon, Nylon MX06, and Nylon 46.

Other materials suitable for use as a material in compositions include polyester elastomers marketed under the tradename SKYPEL by SK Chemicals of Republic of Korea, or diblock or triblock copolymers marketed under the tradename SEPTON by Kuraray Corporation of Kurashiki, Japan, and KRATON by Kraton Polymers Group of Companies of Chester, United Kingdom. All of the materials listed above can provide for particular enhancements to ball layers prepared within the scope of the present invention.

Ionomers also are well suited as a golf ball material, by itself or in a blend of compositions. Suitable ionomeric polymers (i.e., copolymer- or terpolymer-type ionomers) include α-olefin/unsaturated carboxylic add copolymer-type ionomeric or terpolymer-type ionomeric resins. Copolymeric ionomers are obtained by neutralizing at least a portion of the carboxylic groups in a copolymer of an α-olefin and an α,β-unsaturated carboxylic acid having 3 to 8 carbon atoms, with a metal ion. Examples of suitable α-olefins include ethylene, propylene, 1-butane, and 1-hexene. Examples of suitable unsaturated carboxylic acids include acrylic, methacrylic, ethacrylic, α-chloroacrylic, crotonic, maleic, fumaric, and itaconic acid. Copolymeric ionomers include ionomers having varied acid contents and degrees of acid neutralization, neutralized by monovalent or bivalent cations discussed above.

Terpolymeric ionomers are obtained by neutralizing at least a portion of carboxylic groups in a terpolymer of an α-olefin, and an α,β-unsaturated carboxylic acid having 3 to 8 carbon atoms, and an α,β-unsaturated carboxylate having 2 to 8 carbon atoms with metal ion. Examples of suitable α-olefins include ethylene, propylene, 1-butene, and 1 hexene. Examples of suitable unsaturated carboxylic acids include acrylic, methacrylic, ethacrylic, α-chloroacrylic, crotonic, maleic, fumaric, and itaconic acid. Terpolymeric ionomers include ionomers having varied acid contents and degrees of acid neutralization, neutralized by monovalent or bivalent cations as discussed above. Examples of suitable ionomeric resins include those marketed under the name SURLYN® manufactured by E.I. du Pont de Nemours & Company of Wilmington, Del., and IOTEK® manufactured by Exxon Mobil Corporation of Irving, Tex.

Silicone materials also are well suited for use in golf balls, either alone or as a component in a blend of materials. These can be monomers, oligomers, prepolymers, or polymers, with or without additional reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups, such as phenyl, tolyl and xylyl; aralkyl groups, such as benzyl and phenethyl, and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and the copolymers listed above, in which at least one end group is dimethylhydroxysiloxy. Commercially available silicones suitable for use in compositions within the scope of the present invention include Silastic by Dow Corning Corp. of Midland, Mich., Blensil by GE Silicones of Waterford, N.Y., and Elastosil by Wacker Silicones of Adrian, Mich.

Other types of copolymers also can be added to compositions within the scope of the present invention. Examples of copolymers comprising epoxy monomers and which are suitable for use within the scope of the present invention include styrene-butadiene-styrene block copolymers, in which the polybutadiene block contains an epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd. of Osaka, Japan.

It is believed that these deposited layers may be made of any of the materials discussed above or known in the art. For those materials that are not easily thermally sprayed or sintered, such as, for example, rubber compositions, these materials may be powdered and mixed with other, more easily thermally sprayed or sintered materials, such as, for example, metals, alloys, ceramics, plastics, composites, and combinations of these materials. Thus, a composite layer of powdered material and thermally deposited and/or sintered material may be provided.

Next, a discussion will be provided of where deposited layers may be located in various golf ball constructions. A deposited layer may be provided in any of the golf ball constructions discussed herein, including the golf ball constructions of FIGS. 1-4. In a golf ball construction, a deposited layer may be provided as a supplementary layer in addition to those layers discussed above for the ball constructions of FIGS. 1-4. In another instance, a deposited layer may substitute for one or more of the layers of the golf ball constructions of FIGS. 1-4. In a further instance, a golf ball construction may include a one or more deposited layers that are supplementary layers in addition to the layers normally found in a golf ball construction, and/or one or more deposited layers that substitute for a layer of a golf ball construction.

When a deposited layer is substituted for a layer of a golf ball, instead of being provided as a supplemental layer in addition to existing layers, the substituted deposited layer may be different from a supplemental layer. For instance, a substituted deposited layer may be thicker than a supplemental deposited layer. A supplemental deposited layer may have a thickness of, for example, approximately 10 micrometers to 50 micrometers. In contrast, a deposited layer substituted for an existing layer may have a thickness of, for example, approximately 100 micrometers to 2 mm or more. For example, a deposited layer substituted for a cover layer may have a thickness of approximately 2 mm. Such a difference in thickness of a deposited layer may be provided through control of a deposition process, which will be discussed below.

Other deposited layer thicknesses, however, may also be used and a deposited layer that substitutes for an existing layer of a golf ball may have thickness that is similar or the same as a supplemental deposited layer. For example, a substituted deposited layer may have a thickness of, for example, approximately 10 micrometers. For instance, a deposited layer substituted for an outer coating of a golf ball may have a thickness of approximately 20 micrometers.

Figure 5:
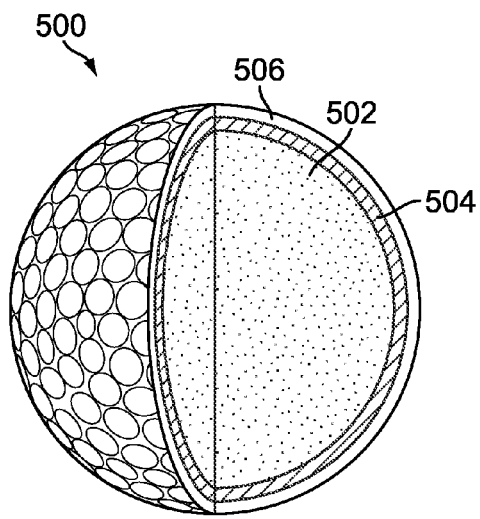
FIG. 5 shows a golf ball including a deposited layer located between the core and cover.

Turning to FIG. 5, a golf ball 500 is shown which has a construction similar to golf ball 100 of FIG. 1. Golf ball 500 has a core 502 and a cover layer 506 but further has an additional or supplemental deposited layer 504. As shown in FIG. 5, deposited layer 504 may be an additional layer located between core 502 and cover layer 506. Supplemental deposited layer 504 may be provided to affect the properties and performance of golf ball 500 in various ways, as will be discussed below.

Figure 6:
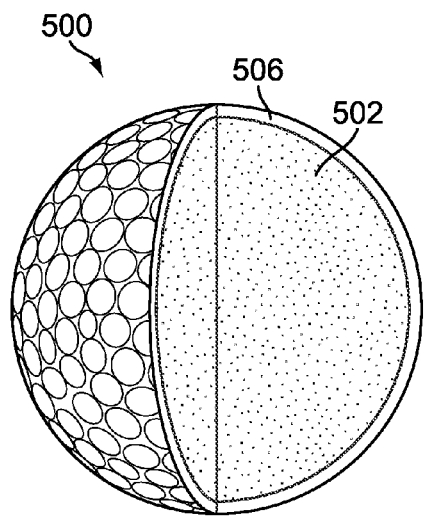
FIG. 6 shows a golf ball having a cover provided by a deposited layer.

In another instance, a deposited layer may be substituted for an existing layer of a golf ball rather than as a supplemental layer added to a golf ball construction. For example, as shown in FIG. 6, golf ball 500 may include a core 502 and deposited layer 506 on core 502. Deposited layer 506 may be substituted for cover layer 110 of golf ball 100 in FIG. 1. Deposited layer 506 may affect the properties and performance of golf ball 500 in different ways than the normal material that is replaced by deposited layer 506, as will be discussed below.

Although the golf balls in the examples of FIGS. 5 and 6 respectfully include a single supplemental deposited layer 504 and a single substituted deposited layer 506, a golf ball may include a plurality of these layers. A golf ball may include a combination of these layers as well. For instance, a golf ball may include both one or more deposited layers as supplemental layers as well as one or more deposited layers that substitute for one or more layers of a golf ball.

Figure 7:
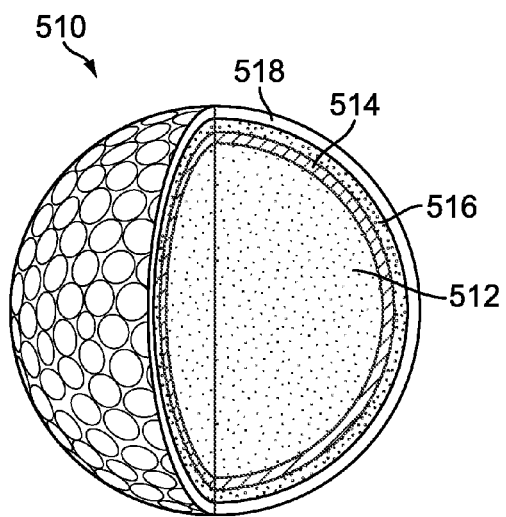
FIG. 7 shows a golf ball having a deposited layer located between a mantle and a cover.

Another example of a golf ball 510 including a supplemental deposited layer 516 is shown in FIG. 7. Golf ball 510 has a construction similar to golf ball 200 of FIG. 2 and includes a core 512, a mantle layer 514, a cover layer 518, and a supplemental deposited layer 516 located between mantle layer 514 and cover layer 518. In another example, golf ball 510 may include a deposited layer (not shown) substituted for either, or both of, mantle layer 514 and cover layer 518. One or more supplemental layers may also be provided in addition to such substituted layers.

Figure 8:
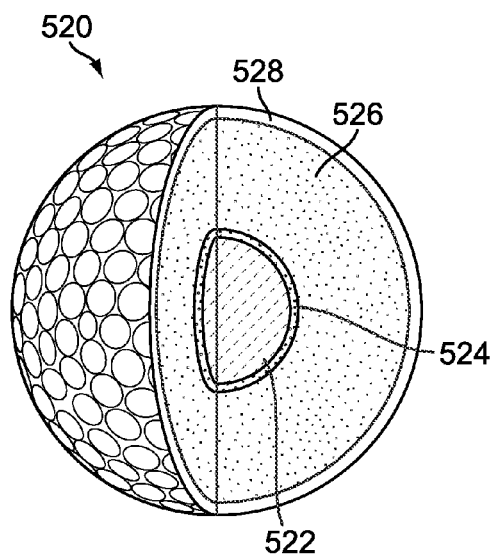
FIG. 8 shows a golf ball having a deposited layer located between an inner core and an outer core.
Figures 9, 10:
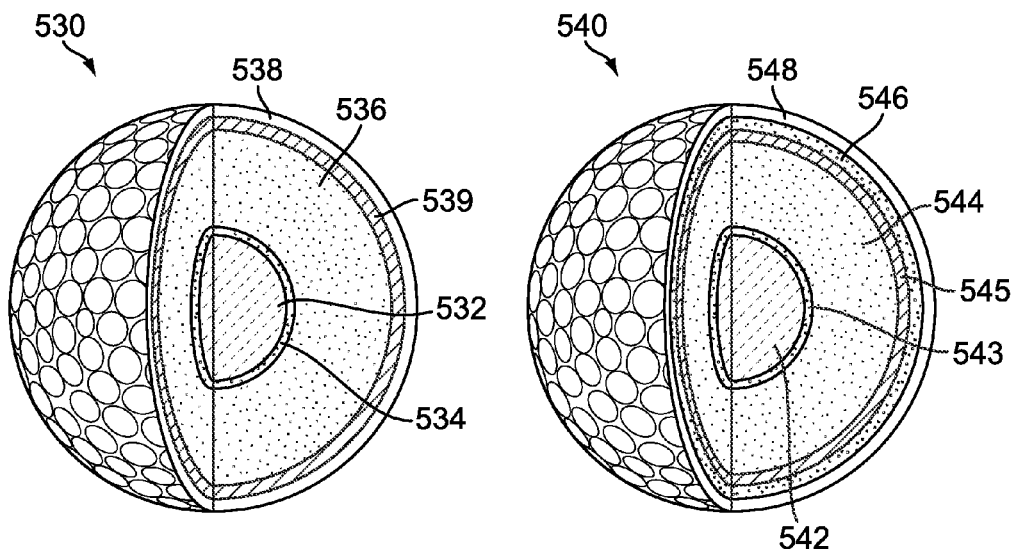
FIG. 9 shows a golf ball having a deposited layer located between an inner core and an outer core and a mantle provided by a deposited layer.
FIG. 10 shows a golf ball including a deposited layer located between an inner core and an outer core and a deposited layer located between a mantle and a cover.

Golf ball 520 in FIG. 8 has a construction similar to golf ball 300 in FIG. 3 and includes an inner core 522, an outer core 526, a cover layer 528, and a supplemental deposited layer 524 located between inner core 522 and outer core 526. Although the example of FIG. 8 includes a single supplemental deposited layer 524, a plurality of supplemental layers may be provided in a golf ball, as discussed above. Turning to FIG. 9, a golf ball 530 is shown that includes an inner core 532, an outer core 536, a first supplemental deposited layer 534 located between inner core 532 and outer core 536, a cover layer 538, and a second supplemental deposited layer 539 located between outer core 536 and cover layer 538. First supplemental deposited layer 534 and second supplemental deposited layer 539 may be the same or similar materials that affect golf ball 530 in the same or similar way, or first supplemental deposited layer 534 and second supplemental deposited layer 539 may differ in material and/or properties and may affect golf ball in different ways.

Although second deposited layer 539 may be a supplemental layer in FIG. 9, deposited layer 539 may instead be a substitutional layer. For example, deposited layer 539 may be provided in golf ball 530 to substitute for the material otherwise used for a mantle layer located between outer core 536 and cover layer 538. Such a substitutional deposited layer 539 may be provided in addition to a supplemental layer, such as supplemental deposited layer 534.

Turning to FIG. 10, a golf ball 540 is shown having a construction similar to golf ball 400 of FIG. 4. Golf ball 540 includes an inner core 542, an outer core 544, a first supplemental deposited layer 543 located between inner core 542 and outer core 544, a mantle layer 546, a second supplemental deposited layer 545 located between outer core 544 and mantle layer 546, and a cover layer 548. In another example, golf ball 540 may include a second supplemental deposited layer but it may be included between mantle layer and cover layer instead, with mantle layer being located where layer 545 is in FIG. 10 and second supplemental deposited layer being located where layer 546 is in FIG. 10.

Figure 11:
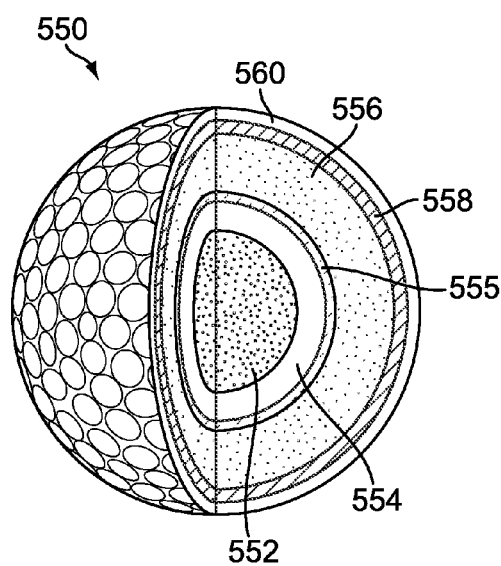
FIG. 11 shows a golf ball include a number of layers and a mantle provided by a deposited layer.

A golf ball may also include a deposited layer located within a layer. Turning to FIG. 11, a golf ball 550 may have a construction similar to golf ball 400 of FIG. 4 and include a core 552, a first outer core portion 554, a second outer core portion 556, a mantle layer 558, a cover layer 560, and a deposited layer 555 located between first outer core portion 554 and second outer core portion 556. First outer core portion 554 and second outer core portion 556 may have the same or similar materials and properties, while deposited layer 555 has properties that differ from those of first outer core portion 554 and second outer core portion 556. Due to its differing properties, deposited layer 555 may be inserted within a layer to alter the performance of a golf ball. In another instance, deposited layer 555 may be located within other layers, such as inner core 552, mantle layer 558, and/or cover layer 560 to split such layers into two or more portions, depending upon how many separate deposited layers are located within a given layer.

Although the individual deposited layers depicted in FIGS. 5-11 are shown as single layers, deposited layers may include a plurality of layers stacked or layered upon one another. For example, although deposited layer 555 is shown as a single, individual layer in FIG. 11, deposited layer 555 may instead include a plurality of layers (not shown) stacked upon one another. For instance, deposited layer 555 may include N number of layers, with N being an integer having a value of 1 or more. The N number of layers may be selected according to a desired property or effect of deposited layer 555.

The properties and effects of deposited layers discussed herein will now be discussed. Whether provided as a supplemental layer or a substitute for a layer in a golf ball, such as in the examples described above, a deposited layer may be provided to alter the properties of a golf ball. As a result, a deposited layer may alter the performance of a golf ball.

One way a deposited layer may affect a golf ball is by affect the moment of inertia of a golf ball. The moment of inertia of a body is a measure of an object's resistance to changes in its rotation rate. Generally, when a body having a high moment of inertia is imparted with a certain rotational energy, the body will rotate at a rate that is slower than the rate at which a body having a low moment of inertia will rotate when imparted with the same amount of rotational energy. The moment of inertia of a spinning body is generally defined as the integral of $r^2*dm$, where r is the radial distance to the axis of rotation and dm is the differential of the mass at that radius r. Moment of inertia has units of mass times distance squared, for example in SI units: $kg*m^2$. The moment of inertia of a uniform solid sphere is given by the equation $(2/5)*mass*radius^2$.

In view of the above, the moment of inertia of a golf ball is determined by the composition and physical arrangement of the various layers making up the golf ball. Accordingly, a number of different golf ball materials may be mixed and matched in various combinations and arrangements to create golf balls varying in density from layer to layer so that golf balls have different moments of inertia. One way this has been accomplished in golf balls is to disperse additives having a higher density within a matrix of a layer. Although such a layer may increase the effective density of the layer and its moment of inertia, the processes used to produce the layer may come at considerable cost and may be at the expense of other design considerations and play characteristics.

According to an embodiment, a deposited layer may be provided in a golf ball to increase a moment of inertia. The deposited layer may be provided in an outer layer of a golf ball, such as a supplemental layer or a layer substituted for a layer normally provided in a golf ball construction. For example, supplemental deposited layer 504 may be provided radially outward from core 502 and the center of golf ball 500 in FIG. 5. In another example, deposited layer may be provided as a substitute for cover layer 506 in golf ball 500 of FIG. 6, which is located radially outward of core 502 and the center of golf ball 500.

Besides being positioned radially outwards from a center of a golf ball, the deposited layer may also be made of a material with a higher density than other layers in the golf ball, thus increasing the moment of inertia of the golf ball. Furthermore, the deposited layer may be provided by a deposition process that does not include injection molding or compression molding, such as spraying or sintering, that is relatively economical. The deposited layer need not include additional materials, such as heavy particles, dispersed within the deposited layer. For example, a deposited layer may be supplemental layer of metal placed between layers of polymer so that the supplemental layer has a higher density than the polymers layers so that moment of inertia of a golf ball is increased. Exemplary metals that may be used as the coating material include aluminum, steel, tungsten, titanium, magnesium, iron, and alloys and mixtures thereof, among a variety of other metals. The metal material may be selected based on density, hardness, workability, and cost effectiveness, for example, among other selection criteria.

Another property of a golf ball that may be affected by a deposited layer is hardness. The hardness of the golf ball's outer layer(s) can also significantly affect a golf ball's play characteristics. Generally, a golf ball with a harder cover layer will achieve reduced spin, but will achieve greater distances. Therefore, a golf ball with a harder cover layer will be better for drives, but more difficult to control on shorter shots. A relatively hard cover is also generally resistant to wear. Conversely, a golf ball with a softer cover will generally experience more spin and therefore be easier to control and stop on the green, but will lack distance off the tee and not be as resistant to wear. In view of these considerations, a golf ball may include a combination of layers with varying hardness, such as a cover that is relatively soft to provide spin and a mantle that is relatively hard to provide distance.

According to an embodiment, a deposited layer may be provided as a cover layer, a mantle layer, or a supplemental layer between the mantle layer and cover layer. Such a deposited layer may be made of a material that is harder than the materials of the adjacent layers to provide a golf ball with a desired hardness in view of distance, spin, and wear resistance.

Another way a deposited coating may affect the properties of a golf ball is by being provided as an outer coating of a golf ball. An outer coating of a golf ball may be located on an outer surface of a cover layer. In such a case, the deposited layer may be applied directly onto the outer surface of the cover layer. In another case, one or more primer layers and/or paint layers may be provided between the cover layer and the deposited layer. The deposited layer may have a different surface texture than the cover layer and thus may affect the aerodynamic properties of the golf ball. When a deposited layer is provided as an outer coating of a golf ball, the deposited layer may have a thickness of, for example, approximately 4 microns to 50 microns. In another example, the deposited layer provided as an outer coating of a golf ball may have a thickness of approximately 10 microns to 30 microns.

In another case, a deposited layer may act as a sealant for the golf ball layers upon which the deposited layer has been applied. A deposited layer may act as a layer to affect the absorption of moisture by sealing out moisture and protecting golf ball layers the deposited layer has been applied to.

For example, supplemental deposited layer 524 applied to the outer surface of inner core 522 of golf ball 520 in FIG. 8. Deposited layer may advantageously seal out moisture to protect inner core 522, such as when inner core 522 is made that is susceptible to diminished performance upon exposure to moisture, such as rubber.

Figure 12:
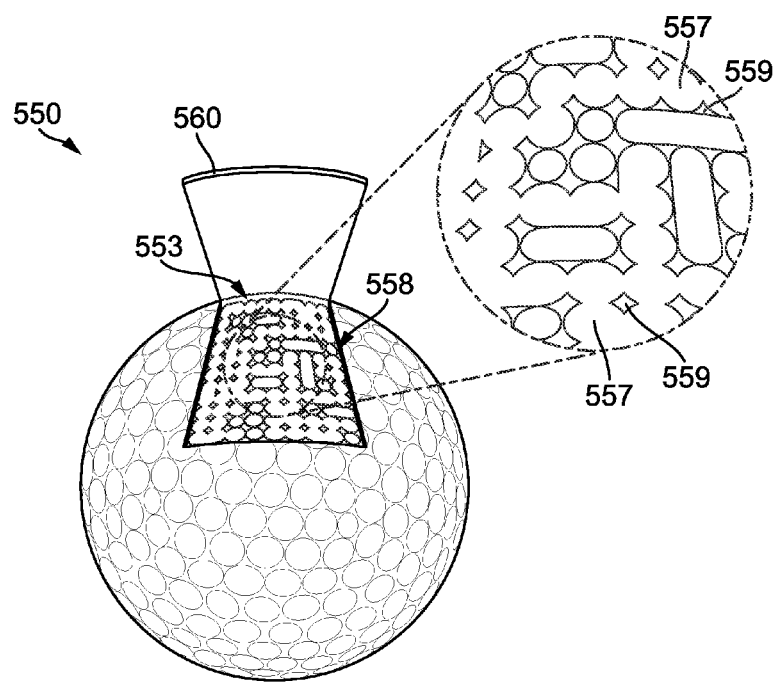
FIG. 12 shows cut away view of the mantle layer of the golf ball of FIG. 11.

Another way a deposited layer may affect the properties of a golf ball is by surface texture. The deposited layers discussed above, whether provided as a supplemental layer or a substitute layer, may have a texture that differs from other layers of a golf ball. Such a difference in texture may alter the properties and performance of a golf ball. For example, mantle layer 558 of golf ball 550 may itself be provided by a deposited layer. FIG. 12 shows an example of such a golf ball 550, in which cover 560 has been partially peeled back to reveal mantle layer 558, which has been provided by a deposited layer. As shown in the enlarged portion of FIG. 12, mantle layer 558 may be formed by particulate material 557 that has been at least partially fused together. Such a deposited layer may be provided, for example, via a sintering process, which will be discussed below. In such a case, deposited mantle layer 558 may have a surface 553 that is not flat and smooth but is instead rounded due to the fusing of particulate material 557 to one another. Such a surface texture may affect the transfer of energy from one layer to another, such as between cover 560 and mantle layer 558.

Deposited mantle layer 558 may include pores 559 located between partially fused particulate material 557, as shown in the enlarged portion of FIG. 12. Pores 559 may be located on surface 553 and/or within a deposited layer. Although a deposited layer may be 100% dense, a deposited layer may also not be fully dense but instead include pores 559. A porous deposited layer may have a porosity of, for example, approximately 1-20% of its volume. As will be discussed below, the porosity of a deposited layer may be predetermined and controlled to affect the properties of the deposited layer.

Figure 13:
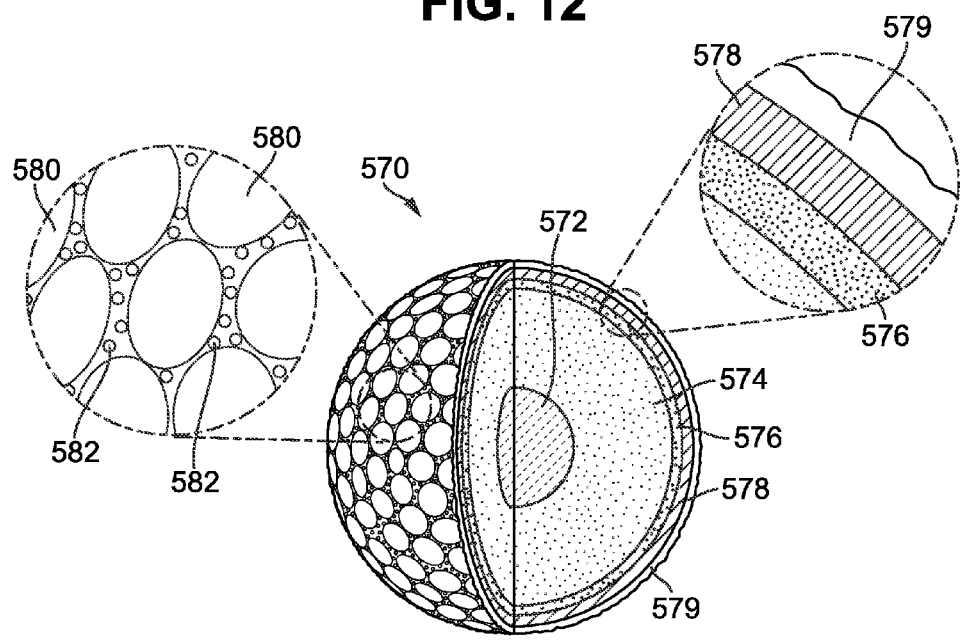
FIG. 13 shows a golf ball including an outer surface layer provided by a deposited layer.

FIG. 13 shows an example of a golf ball 570 that includes an inner core 572, an outer core 574, a mantle layer 576, a cover layer 578, and a deposited layer 579 located on an outer surface of cover layer 578. Deposited layer 579 may be a supplemental layer or may be provided as a substitute layer to replace one or more surface layers provided on the outer surface of cover layer 578. Deposited layer 579 may be provided, for example, by a spraying process, which will be discussed below. Deposited layer 579 may be relatively thin in relation to cover layer 578. For example, cover layer 578 may have a thickness of approximately 1-3 millimeters while deposited layer 579 has a thickness of approximately 10-30 micrometers.

As shown in the enlarged cross-sectional portion of FIG. 13, deposited layer 579 may have a surface texture that is not substantially flat and smooth like the outer surface of cover layer 578 but instead is relatively rough and may have undulations. Further, as shown in enlarged portion of the surface of golf ball 570 in FIG. 13, cover layer 578 may include a plurality of dimples 580, as is known in the art. However, although cover layer 578 may be relatively smooth on lands between dimples 580 and within the surface of dimples 580, deposited layer 579 may provide a surface texture is not smooth but instead includes, for example, pores or pits 582 in the outer surface of deposited layer 579. Pits 582 may be located on lands between dimples 580, as shown in the enlarged surface portion of FIG. 13, or may be located within dimples 580 (not shown), or may be located both on lands and within dimples 580 (not shown). Pits 582 may have a width of, for example, approximately 10-100 micrometers. Because deposited layer 579 may be provided as an outer surface of golf ball 570, the surface texture of deposited layer 579 may provide golf ball 570 with an altered aerodynamic performance, which will be discussed below.

According to another example, a deposited layer may affect the interface normally present between adjacent layers. For instance, a deposited layer may not be highly compatible with the layers adjacent to the deposited layer. Such a deposited layer may be provided as a supplemental layer between two layers that diminishes the amount of energy transferred between the two layers. As a result, when a golf ball is struck and a first layer is compressed, the energy transferred from the first layer to the second layer may be diminished due to the presence of an supplemental deposited layer between the first and second layer, in comparison to a golf ball that does not include the supplemental deposited layer. Such an affect may be desired to alter the feel of a golf ball when the golf ball is struck so that the ball does not feel as hard or stiff when struck.

In the example of FIG. 7, supplemental deposited layer 516 may diminish the amount of energy transferred from cover layer 518 to mantle layer 514. For instance, supplemental deposited layer 516 may be made of a material that has a relatively low adherence to cover layer 518 and mantle layer 514. In another example, supplemental deposited layer 524 between inner core 522 and outer core 526 in FIG. 8, may diminish the amount of energy transferred from outer core 526 towards inner core 522. Such deposited layers may diminish the amount of transferred energy between layers by being less compatible and not bonding to the adjacent layers very strongly. For instance, the deposited layer might permit the adjacent layers to move relative to one another in a shearing motion. In the example of FIG. 8, supplemental deposited layer 524 might permit inner core 522 to move relative to outer core 526 in a shearing motion. In another instance, supplemental deposited layer 524 may be porous and include voids that deaden the transfer of energy from one layer to another. A porous deposited layer may have a porosity of, for example, approximately 1-20% of its volume.

Any desired process may be used to deposit the supplemental or substitute layers discussed above. Processes used to manufacture the deposited layers discussed herein may use include injection molding or compression molding, as conventional golf ball layers are. However, deposited layers may be produced by other manufacturing processes.

In some embodiments, a spray process may be used to produce a deposited layer. A spray process may be, for example, a process that heats a source of deposition material to produce molten or semi-molten droplets of the materials, which are then forced onto a surface via a gaseous spray. A spray process may be, for example, a thermal spraying process or may be a plasma spraying process that ionizes gas to produce a plasma.

Figure 14:
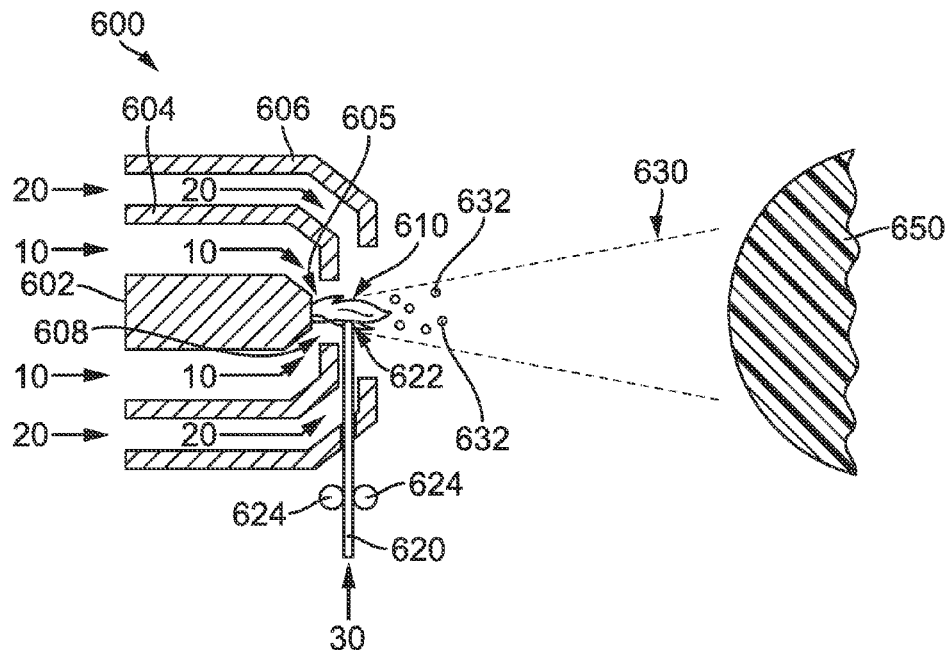
FIG. 14 shows a side cross-sectional view of a spraying process to deposit a layer.

FIG. 14 shows an example of a spraying system 600 for producing a deposited layer on a golf ball component 650. Golf ball component 650 may be any part or layer of a golf ball discussed above, including the layers of golf balls 100, 200, 300, 400, 500, 510, 520, 530, 540, 550, 570 of FIGS. 1-13. Spraying system 600 includes an electrode 602, a first nozzle 604, and a feedstock 620 in solid form that is advanced towards an aperture 605 of first nozzle 604 in direction 30, such as by rollers 624 or other devices used in the art. Feedstock 620 may be, for example, in the form of a solid wire or solid strand. In another example, feedstock 620 may be in the form of solid particulate material that is fed through a tube with an end 622 located near aperture 605. However, feedstock 620 need not be limited by these examples and may instead be in other forms contemplated in the art.

To provide heat to melt feedstock 620, such as at end 622 of feedstock 620 near aperture 605, an electric circuit may be formed between electrode 602 and first nozzle 604, which may create an arc. Alternatively, the arc 608 may be formed between electrode 602 and end 622 of feedstock 620, as shown in FIG. 14, or arc 608 may first be formed between electrode 602 and first nozzle 604 and then transferred from first nozzle 604 to end 622 of feedstock 620, such as by first gas 10. First gas 10 may be introduced into first nozzle 604, flow around electrode 602, and then out of first nozzle 604 through aperture 605. First gas 10 may be, for example, ionized by arc 608 to form a plasma 610. In another example, first gas 10 may combust and form a flame, which may also be represented by numeral 610. In either case, plasma or flame 610 provides heat that melts feedstock 620, particularly at end 622, to produce droplets 632 of feedstock material 620. The heat and first gas 10 exiting through aperture 605 produce a jet or spray 630 that propel droplets 632, which may be in atomized into fine particle sizes, towards a surface of golf ball component 650.

Spray system 600 may further include a second nozzle 606. Second nozzle 606 may extend around or surround electrode 602 and first nozzle 604, as shown in FIG. 14. For example, electrode 602, first nozzle 604, and second nozzle 606 may be concentric to one another. A second gas 20 may be introduced between second nozzle 606 and first nozzle 604 and flow towards plasma or flame 610. Second gas 20 may be provide to assist with controlling a pattern or shape of jet or spray 630. The pressure of gasses 10 and 20, the size of aperture 605, the current for arc 608, a distance between electrode 602 and end 622 of feedstock 620 may each be controlled and varied to affect the intensity and velocity of the spray process.

Figure 15:
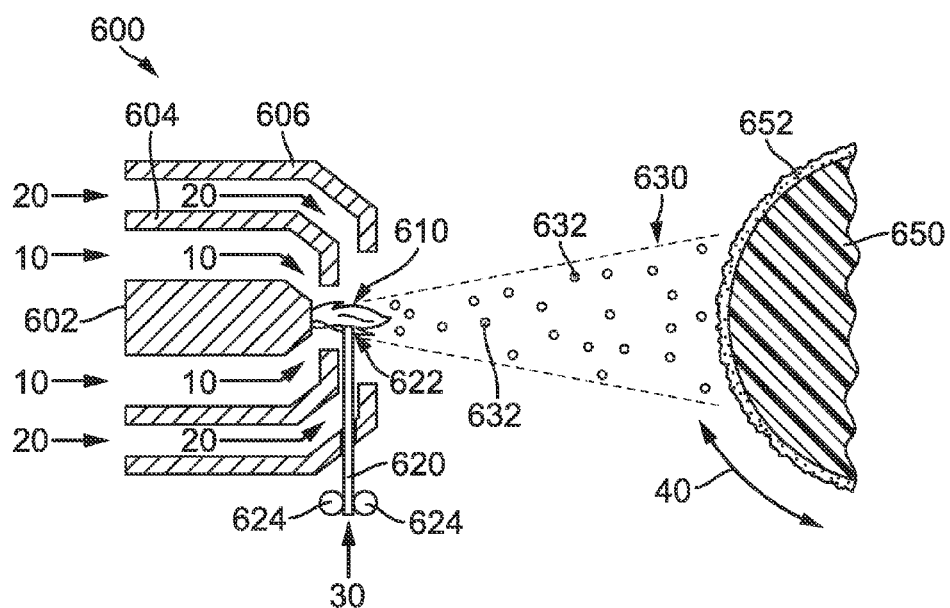
FIG. 15 shows a side cross-sectional view of the spraying process of FIG. 14 after deposition of a layer has commenced.

As shown in FIG. 15, jet or spray 630 forces atomized droplets 632 onto a surface of golf ball component 650 to produce a deposited layer 652. Golf ball component 650 may be held and rotated, such as in direction 40, so that the jet or spray 630 deposits droplets 632 onto the surface of golf ball component 650 in a desired manner. Golf ball component 650 may be held and rotated mechanically. Any desired technique may be used to hold and rotate golf ball component 650 mechanically. For example, golf ball component 650 may be held by a three prong spindle (not shown), which physically holds golf ball component 650 by three prongs that may also be used to rotate golf ball component 650. In another example, golf ball component 650 may be held and rotated by non-contact devices. For instance, golf ball component 650 may be levitated by air streams or magnetically levitated and rotated according to the systems described in U.S. application Ser. No. 13/048,750, filed on Mar. 15, 2011, entitled "Golf Ball Coating System Using Magnetic Levitation," invented by Hsiao-Chin Lin et al., which is hereby incorporated by reference in its entirety.

Another process that may be used to manufacture a deposited layer is a sintering process. A sintering process may, for example, include applying particulate material to a surface and providing heat and/or pressure to cause the particulate material to at least partially fuse together to produce a sintered layer.

Figure 16:
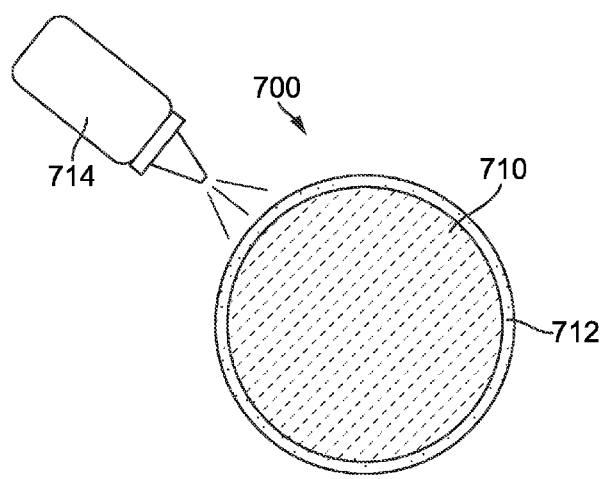
FIG. 16 shows a side cross-sectional view of a golf component coated with an adhesion layer.

Turning to FIG. 16, an exemplary sintering process will now be described. First, a golf ball component 710 may first be provided. Golf ball component 710 may be any part or layer of a golf ball discussed above, including the layers of golf balls 100, 200, 300, 400, 500, 510, 520, 530, 540, 550, 570 of FIGS. 1-13. Golf ball component 710 may be coated with a layer 712 of material that promotes adhesion of particulate material, which is to be sintered, to a surface of golf ball component 710 to provide a coated golf ball component 700. The material of layer 712 may be a binder material or adhesive that may be compatible with the material of golf ball component 710 so that layer 712 sufficiently adheres to golf ball component 710. Layer 712 may be supplied, for example, from a reservoir or applicator 714, or other devices used in the art. Other methods may be used to adhere particles to the surface of golf ball component 710, such giving golf ball component 710 an electrostatic charge to attract particles to its surface. Alternatively, layer 712 or other methods of adhering particles might not be necessary to promote adhesion of particulate material to golf ball component 710.

Figure 17:
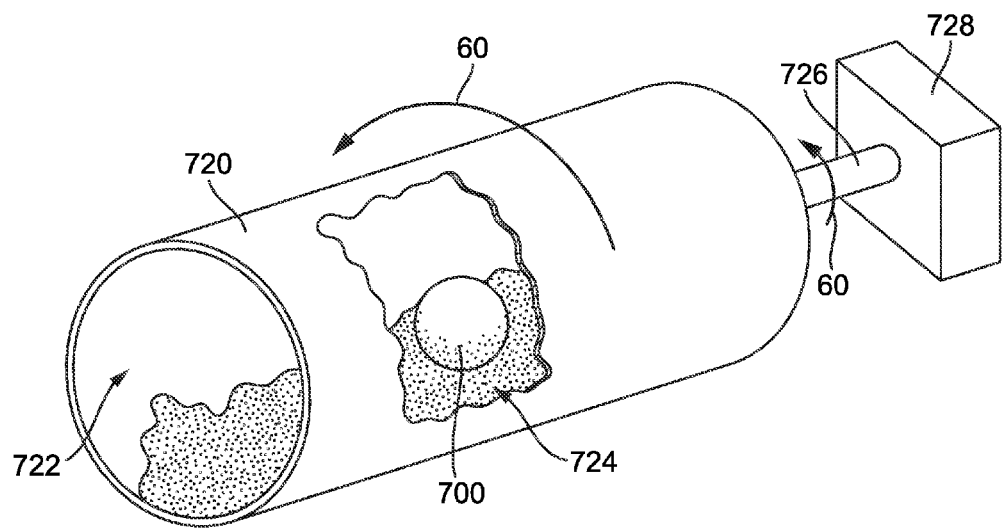
FIG. 17 shows a perspective view of a machine to coat a golf component with particulate material.

Next, particulate material is applied to the outer surface of golf ball component 710. For example, a barrel or drum 720 containing particulate material 724 may be provided, as shown in FIG. 17. Coated golf ball component 700 (or golf ball component 710 without coating 712) may be inserted into barrel 720 via an aperture 722. Barrel 720 may be connected to a motor 728 via a shaft 726, which rotate in direction 60 and in turn cause barrel 720 to rotate in direction 60. During rotation of barrel 720, coated golf ball component 700 (or uncoated golf ball component 710) rolls within drum 720 with particulate material 724, causing the outer surface of coated golf ball component 700 to be covered with the particulate material 724.

Figure 18:
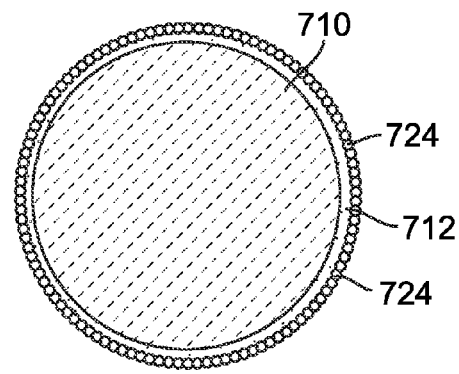
FIG. 18 shows a side cross-sectional view of a golf component coated with particulate material.

Once coating of coated golf ball component 700 is complete, coated golf ball component 700 is removed from barrel 720 to provide a green golf ball component 710 that includes adhesion coating 712 and particulate material 724 embedded in adhesion coating 712, as shown in the example of FIG. 18. A green golf ball component 710 includes particulate material 724 on its surface, with the particulate material 724 not having been at least partially fused together yet. In addition, green golf ball component 710 may include a coating 712, as desired, to promote adhesion of particulate material 724. Alternatively, if golf ball component 710 without coating 712 has been supplied to barrel 720, coating 712 will be absent and particulate material 724 would directly adhere to an outer surface of golf ball component 710 (not shown).

Figure 19:
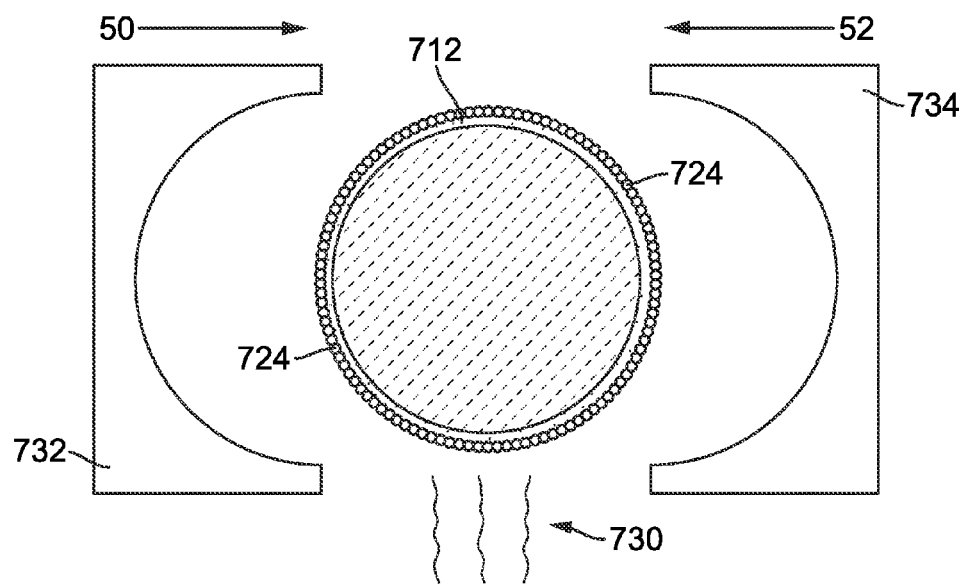
FIG. 19 shows a side cross-sectional view of a sintering process.

Next, particulate material 724 is at least partially fused together in a sintering step. As shown in the example of FIG. 19, heat 730 may be applied to the green form of golf ball component 710 that includes coating 712 and particulate material 724. Heat 730 may be supplied, for example, by a flame, electric coil, electric arc, or other devices contemplated in the art. Heat 730 may permit diffusion of atoms of particulate material 724 so that particulate material 724 may at least partially fuse together. In addition, when coating 712 is provided, heat 730 may cause coating 712 to dissipate. For example, coating 712 may degrade, melt, combust, or dissipate via other methods contemplated in the art. Whether coating 712 is provided or golf ball component 710 is provided uncoated, particulate material 724 at least partially fuses to the outer surface of golf ball component 710 during the sintering step.

In addition to providing heat 730 during the sintering step, or as an alternative to providing heat 730, pressure may be applied to providing sintering of particulate material 724. As shown in the example of FIG. 19, golf ball component 710 coated with particulate material 724 may be placed between a first the 732 that is advanced in first direction 50 and a second the 734 that is advanced in a second direction 52 towards the coated golf ball component to apply pressure and cause particulate material 724 to at least partially fuse together and to the outer surface of the golf ball component 710. Other devices and methods may be used to apply a desired pressure to the green golf ball component 710 during sintering. Once sintering is complete, a golf ball component 740 that includes a sintered layer 742 is provided, as shown in the example of FIG. 20.

Figure 20:
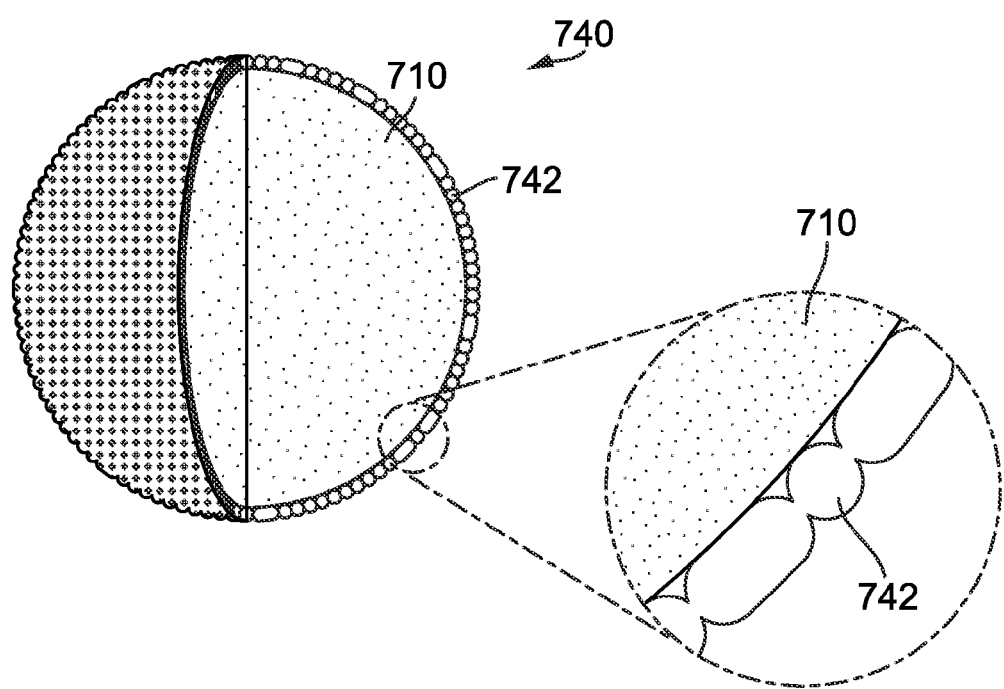
FIG. 20 shows a side cross-sectional view of a golf component including a sintered layer.

As shown in the enlarged portion of FIG. 20, sintered layer 742 may include particulate material that is at least partially fused together. Sintered layer 742 may provide a surface that is not uniform or smooth, as shown in the enlarged portion of FIG. 20, which may advantageously affect the aerodynamics of a golf ball when the sintered layer 742 is provided as an outer surface layer, or may affect the transfer of energy from one layer to another. A sintering process may provide a sintered layer 742 that is porous. A porous sintered layer may have a porosity of, for example, approximately 1-20% of its volume. In another example, porous sintered layer may have a porosity of, for example, approximately 10-20% of its volume. The porosity of the sintered layer may also be controlled to a desired value. For example, the porosity of sintered layer 742 may be controlled so the porosity of the sintered layer is uniform within sintered layer 742. The porosity of sintered layer 742 may be controlled by varying, for example, the size of particulate material 724, the distribution of sizes of particulate material 724, heat 730 and/or pressure applied during the sintering step, and other factors contemplated in the art.

According to an embodiment, different types of processes may be used to deposit layers in a golf ball. For instance, a golf ball may include a layer deposited by a spraying process and a layer deposited by a sintering process. The golf ball may include other layers made by other processes as well, such as layers made by injection molding and/or compression molding.

The materials used to produce a deposited layer may be selected on the basis of a desired property for the layer. For example, if a certain density is desired for the deposited layer, a material may be selected to match the desired density. In another example, if a certain hardness is desired for a deposited layer, a material may be selected on that basis. The material of a deposited layer may be, for example, a metal, polymer, ceramic, or other material used in a golf ball. Further, the material may be any particular material described above for use in a golf ball.

According to an embodiment, a deposition process may be selected according to a material that is desired for a given layer of a golf ball. Such a selection may be made because some processes may be suitable for depositing certain types of materials. For instance, because thermoplastic polymers can soften or melt at elevated temperatures, a spraying process or a sintering process may be used to deposit a thermoplastic polymer. Thermoset polymers, once cured, will not melt at elevated temperatures like thermoplastic polymers. However, a spraying process may be used to deposit a thermoset polymer that is cured once the thermoset polymer has been deposited. The thermoset polymer may be fed to a flame or plasma as a feedstock, as discussed above, which is melted and atomized into droplets. Because the droplets are heated, the thermoset plastic is also cross-linked and cured as part of the spraying process, which advantageously avoids an additional curing step.

According to an embodiment, a golf ball may include both a thermoplastic polymer layer deposited by a sintering process and a thermoset polymer layer deposited by a spraying process. The thermoplastic polymer may be any of the thermoplastic polymers noted above and the thermoset polymer may be any of the thermoset polymers noted above.

Figure 21:
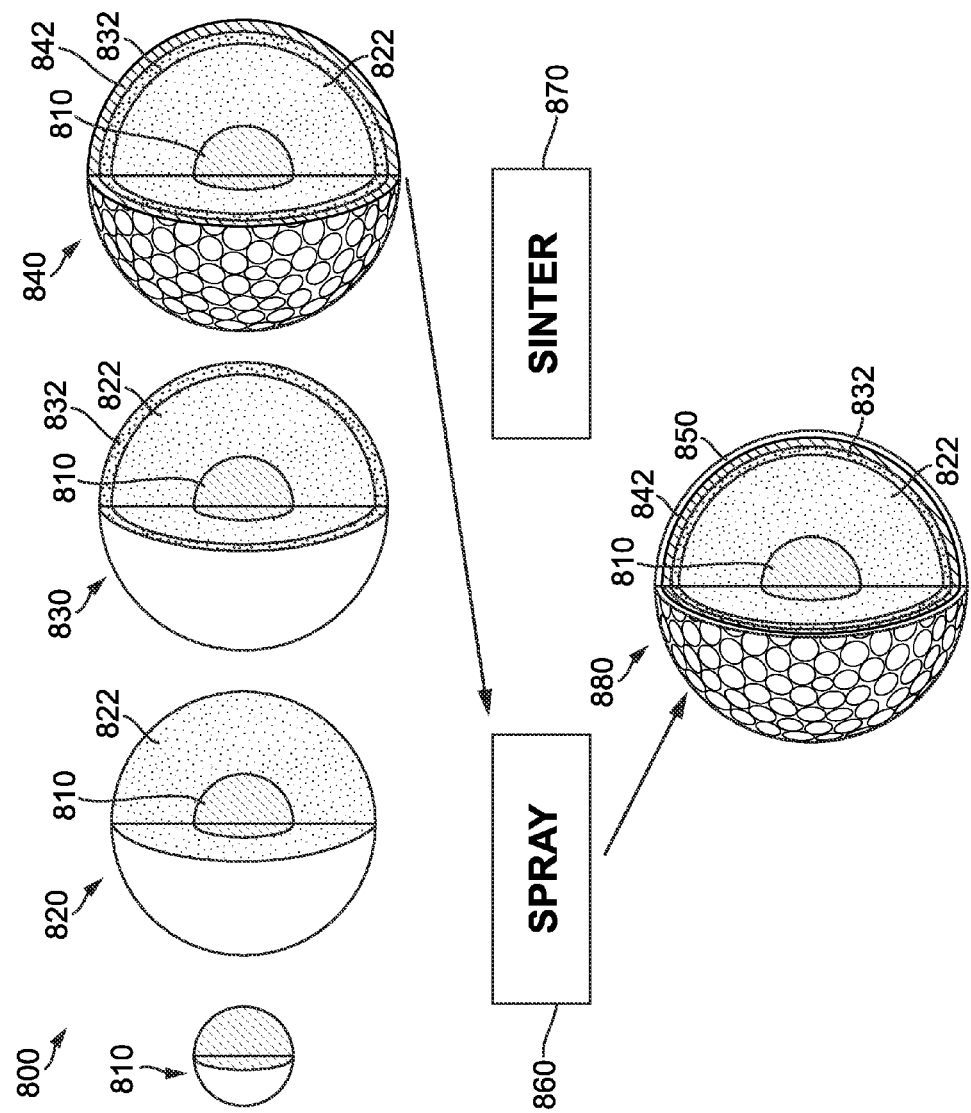
FIG. 21 shows a first example of a process of selecting a golf component and depositing a layer on the golf component.

Methods to produce a deposited layer may incorporate any of the features and embodiments discussed herein. Turning to FIG. 21, the steps of an exemplary process 800 for depositing a golf ball layer are shown. In a first step, a component of a golf ball to be coated with the deposited layer is selected. The golf ball component may be a core 810 (which may serve as an inner core, such as inner core 440 of golf ball 400 in FIG. 4); a combination 820 of an inner core 810 and outer core 822; a combination 830 of inner core 810, outer core 822, and a mantle layer 832; or golf ball component may be a combination 840 of inner core 810, outer core 822, mantle layer 832, and cover layer 842. In another example, the golf ball component may be any part or layer of a golf ball discussed above, including the layers of golf balls 100, 200, 300, 400, 500, 510, 520, 530, 540, 550, 570 of FIGS. 1-13. In a further example, selecting the golf ball component to be coated may include selecting a material to be deposited onto the golf ball component. Once the golf ball component to be coated has been selected, the process for providing a deposited layer on the golf ball component is selected. As shown in FIG. 21, a spraying process 860 or a sintering process 870 may be selected.

In the exemplary process of FIG. 21, combination 840 of inner core 810, outer core 822, mantle layer 832, and cover layer 842 is selected as the golf ball component to be coated with a deposition layer and spraying process 860 is selected as the process to deposit the layer. The resulting product may be, for example, a golf ball 880 that includes inner core 810, outer core 822, mantle layer 832, cover 842, and a deposited outer layer 850 on the outer surface of cover 842. In other words, the layer deposited by spraying process 860 provides an outer layer, such as deposited layer 579 in FIG. 13.

Figure 22:
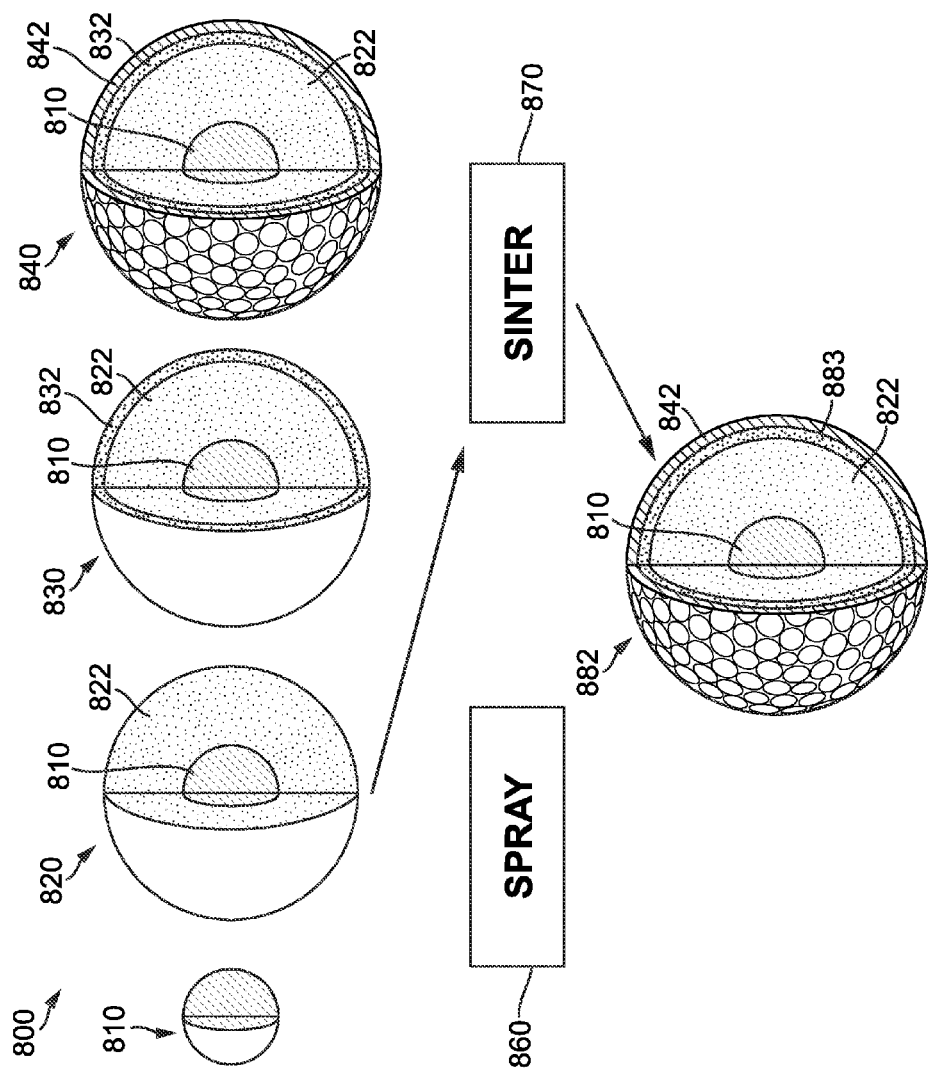
FIG. 22 shows a second example of a process of selecting a golf component and depositing a layer on the golf component.

FIG. 22 shows another exemplary process in which combination 820 of inner core and outer core 822 is selected as the golf ball component to be coated with a deposition layer and sintering process 870 is selected as the process to deposit the layer. The resulting product may be, for example, a golf ball 882 that includes inner core 810, outer core 822, a deposited layer 883, and cover 842. Deposited layer 883 may be substituted for a mantle layer, such as mantle layer 420 of golf ball 400 in FIG. 4, or deposited layer may be provided as a supplemental layer between outer core 822 and cover 842. Other combinations may be envisioned from the options presented in FIGS. 21 and 22 by selecting other combinations of golf components and deposition processes not described above.

Golf balls of embodiments discussed herein can be 'conforming' or 'nonconforming' golf balls. That is, golf balls having the soft surface coating described herein may conform to the rules regarding, for example, weight, diameter, physical design, and performance properties and characteristics, of one or more of various governing entities, such as the United States Golf Association (USDA). Such balls typically are required for professional tournament play. However, nonconforming balls for casual use, for training, and for other uses, also are contemplated herein.

While various embodiments of the invention have been described, the description is intended to be exemplary, rather than limiting and it will be apparent to those of ordinary skill in the art that many more embodiments and implementations are possible that are within the scope of the invention. Further, any element of any embodiment discussed or described herein may be used or adapted for use in any other embodiments described herein unless specifically limited in the description. Accordingly, the invention is not to be restricted except in light of the attached claims and their equivalents. Also, various modifications and changes may be made within the scope of the attached claims.

What is claimed is:

1. A method of making a golf ball, comprising:
   providing a golf ball component; and
   depositing a first layer onto the golf ball component by a sintering process;
   wherein the sintering process includes the steps of:
      coating the golf ball component with particulate material, and
      applying at least one of heat and pressure to the golf ball component coated with particulate material to partially fuse the particulate material together, wherein pores are voids located between adjacent particulates of partially fused particulate material.

2. The method of claim 1, wherein the step of coating the golf ball component with the particulate material includes applying an adhesive to the golf ball component.

3. The method of claim 1, wherein the step of coating the golf ball component with the particulate material includes using an electrostatic charge to coat the golf ball component with the particulate material.

4. The method of claim 1, wherein the particulate material comprises a metal.

5. The method of claim 4, wherein the metal is selected from the group consisting of: aluminum, steel, tungsten, titanium, magnesium, iron, and alloys and mixtures thereof.

6. The method of claim 1, further comprising a step of depositing a second layer onto the golf ball component by a thermal spraying process.

7. The method of claim 6, wherein the first layer comprises a thermoplastic polymer deposited by the sintering process and the second layer comprises a thermoset polymer deposited by the thermal spraying process.

8. A method of making a golf ball comprising:
providing a golf ball component;
depositing particles onto the golf ball component; and
fusing the particles together by sintering, wherein the deposited particles include pores that are voids located between adjacent particulates of fused particulate material.

9. The method of claim 8, wherein the golf ball component comprises a core.

10. The method of claim 8, wherein the golf ball component comprises a cover.

11. The method of claim 10, wherein the fused particles form a sintered coating layer having a thickness of approximately 10-30 micrometers.

12. The method of claim 10, wherein the fused particles form a sintered coating layer including pits located in at least one of dimples and lands formed in the cover.

13. The method of claim 8, wherein sufficient particles are deposited to form a second layer.

14. The method of claim 13, wherein the second layer comprises at least one of a core layer, a mantle, and a cover layer.

15. The method of claim 8, further comprising the steps of:
forming a layer on the fused particles;
depositing particles onto the layer; and
fusing the particles deposited onto the layer together by sintering.

16. The method of claim 15, wherein the golf ball component is at least one of a core layer and a mantle, and the layer formed on the fused particles is at least one of a core layer, a mantle, and a cover layer.

17. The method of claim 15, wherein the golf ball component is a core layer and the layer formed on the fused particles is a mantle.

18. The method of claim 15, wherein the golf ball component is a core layer and the layer formed on the fused particles is a cover layer.

19. A method of making a golf ball, comprising:
providing a golf ball component;
coating the golf ball component with particulate material; and
sintering the golf ball component and particulate material with at least one of heat and pressure to form a sintered layer;
wherein the sintered layer includes partially fused particulate material and pores that are voids located between adjacent particulates of the partially fused particulate material.

* * * * *